United States Patent
Liu et al.

(10) Patent No.: US 11,215,719 B2
(45) Date of Patent: Jan. 4, 2022

(54) PERFORMANCE-LEVEL SEISMIC MOTION HAZARD ANALYSIS METHOD BASED ON THREE-LAYER DATASET NEURAL NETWORK

(71) Applicant: QINGDAO UNIVERSITY OF TECHNOLOGY, Qingdao (CN)

(72) Inventors: Wenfeng Liu, Qingdao (CN); Zheng Zhou, Qingdao (CN); Jianfeng Li, Qingdao (CN)

(73) Assignee: QINGDAO UNIVERSITY OF TECHNOLOGY, Qingdao (CN)

( * ) Notice: Subject to any disclaimer, the term of this patent is extended or adjusted under 35 U.S.C. 154(b) by 0 days.

(21) Appl. No.: 17/211,891

(22) Filed: Mar. 25, 2021

(65) Prior Publication Data
US 2021/0302603 A1    Sep. 30, 2021

(30) Foreign Application Priority Data

Mar. 30, 2020    (CN) .......................... 202010236208.9

(51) Int. Cl.
*G01V 1/00*    (2006.01)
*G06N 3/04*    (2006.01)
(Continued)

(52) U.S. Cl.
CPC .............. *G01V 1/008* (2013.01); *G01V 1/307* (2013.01); *G06N 3/04* (2013.01); *G06N 7/005* (2013.01);
(Continued)

(58) Field of Classification Search
CPC .......... G01V 1/008; G01V 1/307; G06N 3/04; G06N 7/005
See application file for complete search history.

(56) References Cited

U.S. PATENT DOCUMENTS 5,490,062 A * 2/1996 Leach ................... G01V 1/008
                                                     702/15
7,280,920 B1 * 10/2007 Whiteside .............. G01V 1/008
                                                     702/15

OTHER PUBLICATIONS

C. Allin Cornell, et al., Engineering Seismic Risk Analysis, Bulletin of the Seismological Society of America, 1968, pp. 1583-1606, vol. 58 No. 5.
(Continued)

*Primary Examiner* — Ian J Lobo
(74) *Attorney, Agent, or Firm* — Bayramoglu Law Offices LLC

(57) ABSTRACT

A performance-level seismic motion hazard analysis method includes: (1) extracting seismic motion data and denoising the data; (2) extracting feature parameters from the data, and carrying out initialization; (3) generating a training set, an interval set and a test set; (4) training a multi-layer neural network based on the training set; (5) training output values of the neural network based on the interval set, and calculating a mean and a standard deviation of relative errors of the output values; (6) training the neural network based on the test set to determine output values, and calculating a magnitude interval based on an interval confidence; (7) carrying out probabilistic seismic hazard analysis to determine an annual exceeding probability and a return period of a performance-level seismic motion; and (8) determining a magnitude and an epicentral distance that reach the performance-level seismic motion based on the performance-level seismic motion and consistent probability.

7 Claims, 3 Drawing Sheets

(51) Int. Cl.
G01V 1/30 (2006.01)
G06N 7/00 (2006.01)
G06N 3/08 (2006.01)

(52) U.S. Cl.
CPC .... *G01V 2210/324* (2013.01); *G01V 2210/63* (2013.01); *G06N 3/08* (2013.01)

(56) References Cited

OTHER PUBLICATIONS

GB18306-2015, Seismic Ground Motion Parameters Zonation Map of China, 2015, The Standardization Administration of the People's Republic of China.

The Compiling Committee of Seismic Zoning Map in China, Seismic Intensity Zoning Map of China, 1992, pp. 1-10, vol. 8 No. 4.

* cited by examiner

PERFORMANCE-LEVEL SEISMIC MOTION HAZARD ANALYSIS METHOD BASED ON THREE-LAYER DATASET NEURAL NETWORK

CROSS REFERENCE TO THE RELATED APPLICATIONS

This application is based upon and claims priority to Chinese Patent Application No. 202010236208.9, filed on Mar. 30, 2020, the entire contents of which are incorporated herein by reference.

TECHNICAL FIELD

The invention relates to an anti-seismic technique analysis method, in particular to a performance-level seismic motion hazard analysis method based on a three-layer dataset neural network.

BACKGROUND

The "time, space and magnitude" of earthquakes are three key factors of seismic hazard analysis. In 1968, Cornell put forward, in 1968, probabilistic seismic hazard analysis which reflects the distribution requirements of earthquake magnitudes by a magnitude-frequency function relation; Poisson distribution reflects the probability of earthquake occurrence with the variation of time; and the uniform seismic distribution of all points in a potential seismic source zone reflects the seismic spatial distribution requirements. To correct an assumed proximity of the uniform distribution in a potential seismic source zone, *Earthquake Intensity Zoning Map of China*, 1990, sets forth a comprehensive probabilistic seismic hazard analysis method which constructs a potential seismic source zone by two levels, and *Seismic Motion Parameters Zoning Map of China*, 2015, constructs a potential seismic source zone by three levels.

Seismic hazard analysis typically includes deterministic hazard analysis and probabilistic seismic hazard analysis. The deterministic hazard analysis provides a deterministic estimation of a seismic event based on the seismogeology, the seismic activity, the maximum historical earthquake and the like. In spite of the explicit engineering significance and the simple and intuitive expression form, the probabilistic seismic hazard analysis cannot realize an objective and quantitative expression due to the uncertainty of a future earthquake in time, space and magnitude. The probabilistic seismic hazard analysis is a method for analyzing the probability that a seismic parameter (intensity, acceleration, velocity, response spectrum or the like) of a specific zone exceeds a given value within a design reference period in the future and can provide a quantitative probability index under the condition where the time, space and magnitude of a future earthquake are uncertain. There are mainly three methods, namely the empirical statistics method, the random vibration method based on a seismic source spectrum, and the seismological method based on an empirical green function. The seismic hazard analysis methods have been applied to actual engineering, but they still have the following technical difficulties to be overcome: the rationality of the power law form of b value of the G-R relation in a small zone, the objectivity of determining the activity and spatial distribution function of a potential seismic source zone based on the activity of a seismic belt, the hyper-validity of a prediction result of probabilistic seismic hazard analysis in a large-scale time sequence, the limitation of the empirical statistics method in regional applicability, and the uncertainty of a complicated seismic theoretical calculation model of the random vibration method based on a seismic source spectrum and the seismological method based on an empirical green function. Thus, it is a novel technique to improve the seismic hazard analysis effect by big data-drive seismic hazard prediction directly based on actual seismic parameters.

In the aspect of deep learning based on a neural network, there are two training structural models at present, one is training set+test set, and the other is training set+verification set+test set. The verification set involved in the latter method is used to correct and improve a neural network model of the training set. From this point of view, these two methods are essentially identical. However, in case of a small data size, there will be difficulties that cannot be overcome in the test set. The most common method is to evaluate the generalization ability of a learning method by error testing. However, such an evaluation depends on test datasets which are limited, so it is quite likely that an invalid evaluation result is obtained. Thus, how to change the training structural models to improve the robustness of the deep learning based on the neural network is also a crucial technique of machining learning.

In the aspect of seismic hazard analysis, all existing methods determine seismic parameters from the hazards caused by the occurrence of an earthquake, that is, from the initial point of the occurrence of the earthquake. However, performance (behavior)-based anti-seismic design considers problems from the performance (behaviors) of a structural earthquake, that is, from structural behavior results resulting from the occurrence of an earthquake. Existing documents and patents have put forward performance-level anti-seismic design methods, but none of these documents and patents involves a performance-level seismic motion hazard analysis method.

The seismic motion attenuation relation has a most outstanding and direct influence on seismic hazard analysis results. At present, the seismic motion attenuation relation is restrained by the expression form and only includes three parameters: the seismic motion (including the intensity), the magnitude and the epicentral distance, and thus cannot comprehensively reflect the seismic complicity and is only suitable for attenuation simulation of regional seismic motions.

SUMMARY

To technical effect to be realized by the invention is to overcome the above-mentioned defects by providing a performance-level seismic motion hazard analysis method based on a three-layer dataset neural network. According to the performance-level seismic motion hazard analysis method based on a three-layer dataset neural network, multiple parameters are input to a neural network by means of big data recorded in earthquakes, and a novel neural network training method is used to predict the seismic motion attenuation relation, thus improving the universality and flexibility of the attenuation relation.

To fulfill the aforesaid objective, the invention adopts the following technical solution: a performance-level seismic motion hazard analysis method based on a three-layer dataset neural network comprises the following steps:

(1) Acquiring seismic motion data and denoising the data;
(2) Extracting feature parameters from the data, and carrying out initialization;
(3) Generating a training set, an interval set and a test set;
(4) Training a multi-layer neural network based on the training set;
(5) Training output values of the neural network based on the interval set, and calculating a mean and a standard deviation of relative errors of the output values;
(6) Training the neural network based on the test set to determine output values, and calculating a magnitude interval based on an interval confidence;
(7) Carrying out probabilistic seismic hazard analysis to determine an annual exceeding probability and a return period of a performance-level seismic motion; and
(8) Determining a magnitude and an epicentral distance reaching the performance-level seismic motion based on the performance-level seismic motion and a consistent probability.

At present, million-level or ten million-level big data based on earthquake records are not available yet, and when deep learning based on an existing neural network is used to predict the seismic motion attenuation relation, there will be some difficulties that cannot be overcome in the test set. To overcome this defect, the patent adopts a training set+interval set+test set training structural model, which is different from the existing training structural model and improves the robustness of deep learning based on the neural network. To overcome the defect of no performance-based seismic motion hazard analysis method at present, the patent adopts a deep neural network based on three layers of datasets to predict the seismic motion attenuation relation, adopts a probabilistic seismic hazard analysis method to predict the annual exceeding probability and return period of a performance-level seismic motion, and determines the magnitude and epicentral distance of a set earthquake based on the performance-level seismic motion and the consistent probability.

DETAILED DESCRIPTION OF THE EMBODIMENTS

Figure 1:
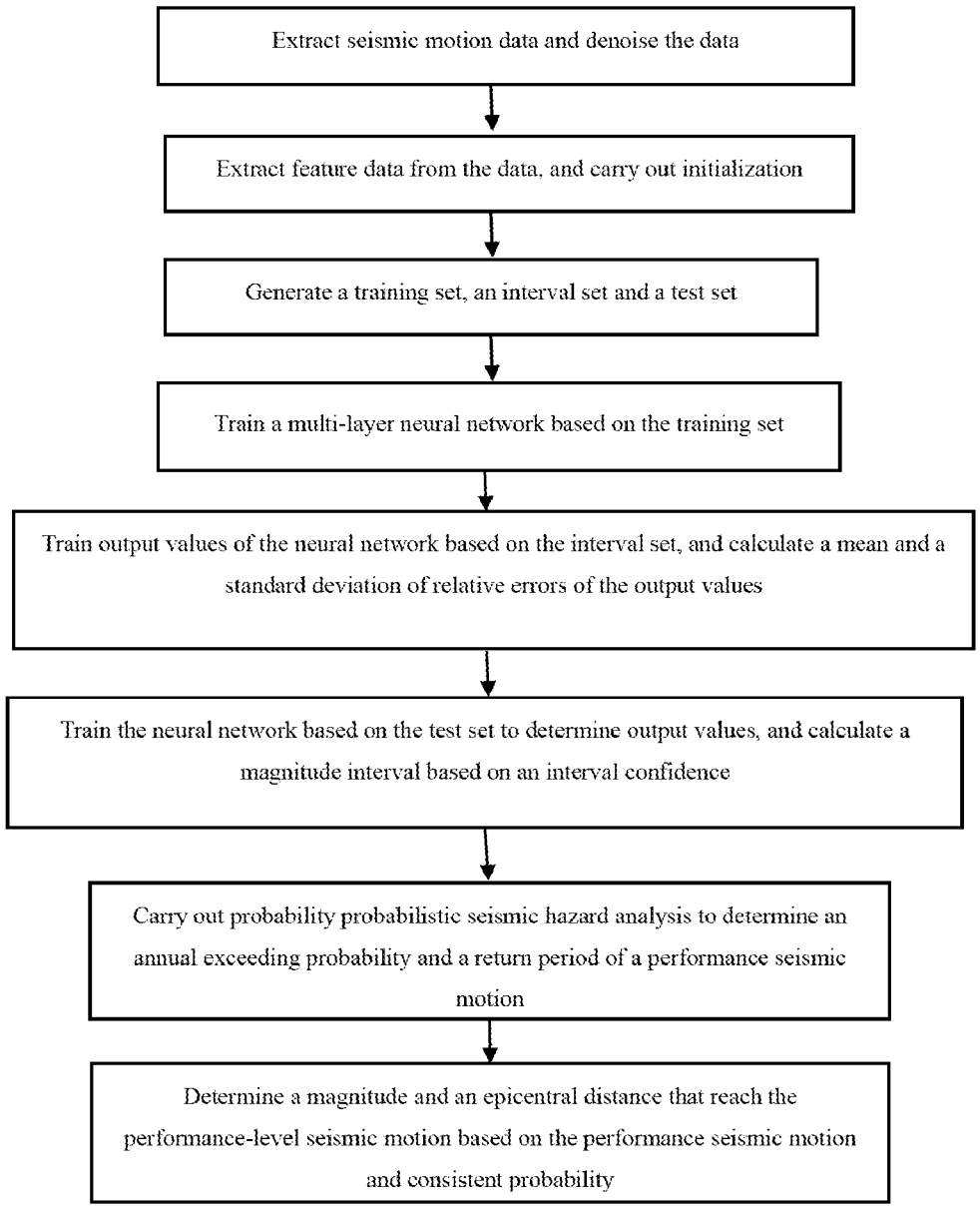
FIG. 1 is a flow diagram of a method of the invention.

The invention provides a performance-level seismic motion hazard analysis method based on a three-layer dataset neural network, comprising the following steps (as shown in FIG. 1):

1. Acquiring seismic motion data and denoising the data: a great deal of ground motion records (including the acceleration, velocity and displacement of ground motions) are collected, base-line correction, band-pass filtering and other cleaning work are carried out, and data formats of the ground motion records are unified.

2. Extracting feature parameters from the data and carrying out initialization: input feature parameters x of a neural network are extracted from the ground motion records, and correlation verification and data initialization are carried out.

The feature parameters include: logarithm LnY of a performance-level seismic motion, magnitude M, focal distance R, focal depth H, fault type F, fault dip $\theta_1$, fault strike $\theta_2$, fault tendency $\theta_3$, slide angle $\theta_4$, record longitude $\theta_{0X}$, dimensionality $\theta_{0Y}$ and field $V_{30}$.

The correlation of the feature parameters x is verified, specifically, information gain Gain(A,B)=H(A)−W(A|B) of every two features is calculated, wherein A is a feature parameter, Gain(A,B) is the reduction of the uncertainty of an exceeding probability B under the condition where the feature parameter A of the information gain is constant, and H(A/B) is a condition entropy when the feature parameters x are fixed. The degree of correlation should be less than 10%; if the degree of correlation is greater than 10%, corresponding features should be removed to form a new data list, and the finally feature parameter is X.

The final feature x is initialized. For example, all features are scaled to 0-1 through the MinMaxScaler algorithm, and a transfer function is:

$$x_i' = \frac{x_i - x_{i\,min}}{x_{i\,max} - x_{i\,min}}$$

In this function, $x_{i\,min}$ is a minimum value of a feature parameter $x_i$ in a dataset, and $x_{i\,max}$ is a maximum value of the feature parameter $x_i$ in the dataset.

The magnitude M is taken as the last column of the data list, and initialized data are ranked by the magnitude from small to large to establish a new input list.

3. Data for the training set, data for the interval set and data for the test set account for 60%, 20% and 20% of a total data size, respectively.

4. A multi-layer neural network (MLP) is trained in the training set through a conventional neural network training method.

①  The MPL is constructed by an input layer, a hidden layer and an output layer through a feed-forward BP algorithm. With an MLP developed by Python as an example, an MLPClassfier( ) function in a Scikit-Learn machine learning library is called to input external parameters such as hidden_layer_sizes (sizes of the hidden layer), activation (activation function), slover (optimizer), alpha (regularization parameter) and max_iter (iteration depth), so that a neural network object is constructed. All or part of these user-defined parameters are determined to give value lists, respectively, such as activation: {'identity', 'logistic', 'tan h', 'relu'}, grid search objects for cross validation are constructed, and the training set is converted into an object ndarray in a Python Numpy operation library, and the object ndarray is input to the grid search object to determine an optimal parameter combination of the model.

②  The MLP is defined according to the optimal parameter combination obtained in the previous step, the object ndarray of a training set tag is input to a network, a difference between an output value of the current neural network and the data label is calculated, an error function is fed backward to each node through the BP algorithm to calculate the gradient, the weight and deviation value of each node are updated gradually, and the MLP is trained.

5. Outputting a magnitude from the interval set based on the trained neural network, and calculating a mean and a standard deviation of relative errors of values output from the interval set.

Data in the interval set are input to the neural network trained in Step (4) to obtain an output $M'_h{}^*$ of each piece of data, the output $M'_h{}^*$ is compared with true data $M_h$ to calculate to calculate a relative error $$\Delta M = \frac{M'^*_h - M_h}{M_h}$$

of each piece of output data, and the mean $\mu$ and the standard deviation $\varepsilon$ of the relative errors of the values output from the interval set are calculated.

6. Outputting a magnitude $M_h{}^*$ from the test set based on the trained neural network, and calculating a magnitude interval according to an interval confidence.

Data in the test set are input to the neural network trained in Step (4) to acquire an output $M_h{}^*$ of each piece of data, a relative error $\Delta M$ between the relative error obtained in Step (5) and a true label $M_h$ is calculated based on the mean $\mu$ and the standard deviation $\varepsilon$ of the relative errors obtained in Step (5), $M_h$ is expressed as $$M_h = \frac{M^*_h}{1+\Delta M} = \frac{M^*_h}{1+\mu \pm l\varepsilon},$$

the confidence is set to 95%, on the principle that 95% of $M_h$ fall within the interval $$\left[ \frac{M^*_h}{1+\mu+l\varepsilon}, \frac{M^*_h}{1+\mu-l\varepsilon} \right],$$

a minimum value meeting the confidence requirement is calculated, $$\left[ \frac{M^*_h}{1+\mu+l\varepsilon}, \frac{M^*_h}{1+\mu-l\varepsilon} \right]$$

is a magnitude interval meeting the confidence requirement, and $M_{hmin}{}^*$ and $M_{hmax}{}^*$ are a minimum magnitude and a maximum magnitude in the magnitude interval, respectively.

7. Carrying out probabilistic seismic hazard analysis to determine and an annual exceeding probability and a return period of a performance-level seismic motion.

① A field building reaching the performance-level seismic motion Y is determined with reference to a method in a granted or disclosed invention patent of the inventor.

② A potential seismic source is determined in terms of the three-level zoning principle in *Seismic Motion Parameters Zoning Map of China GB18306-2015*.

③ An initial magnitude $M_0$ and a magnitude upper limit $M_{uz}$ of the potential seismic source zone are determined, and n magnitude levels $M_j$ (j=1, 2, . . . , n) are determined from the initial magnitude $M_0$ to the magnitude upper limit $M_{uz}$.

④ In terms of a G-R magnitude-frequency relation formula lgN=a−bM, statistics is carried out on actual earthquake magnitudes M and frequencies N to determine values of a and b, an intermediate parameter $\beta$=bln 10 is set, and an annual occurrence rate $v_0$ of the initial magnitude and magnitudes above in the potential seismic source zone is calculated;

⑤ According to the determined seismic motion Y reaching a performance level and a hypocentral distance R of the potential seismic source zone, q $M^*_{Yhp}$ reaching the performance-level seismic motion Y are obtained between $M^*_{Yhmin}$ and $M^*_{Yhmax}$, that reach the performance-level seismic motion Y as verified in Step (6), by a step length 0.1 of the magnitude levels, wherein $M^*_{Yhmin}$ is a minimum magnitude value corresponding to the performance-level seismic motion Y, and $M^*_{Yhmax}$ is a maximum magnitude value corresponding to the performance-level seismic motion Y;

⑥ In any one potential seismic source zone k, $M_{imin}$ and $M_{imax}$ are a maximum value and a maximum value within the magnitude level $M_i$ respectively, $M_{imin} \leq M_{Yhp}{}^* < M_{imax}$, and the occurrence rate of an earthquake over $M_{Yhp}{}^*$ in the $k^{th}$ potential seismic source zone is determined $$v(S_a \geq Y | M, R) = \sum_{j=i}^{n} \frac{2v_0 \exp[-\beta(M_j - M_0)]\sinh\left(\frac{1}{2}\beta\Delta M\right)}{1 - \exp[-\beta(M_{uz} - M_0)]} \cdot f_{k,M_j} \quad (1)$$

In this formula, $S_a$ is a seismic motion parameter which may be the acceleration, the velocity, the response spectrum or the like; $v_0$ is an annual average rate of earthquake occurrence in the potential seismic source zone; $f_{k,Mj}$ is a spatial distribution coefficient of the potential seismic source zone k and the magnitude level $M_j$ and is determined according to the factors such as the seismic activity feature, the zoning map occurrence rate, the seismotectonic condition, the seismicity, the grid activity, the occurrence rate of a major earthquake, the medium and long term risk, and the elapsed time;

⑦ The exceeding probability of occurrence of an earthquake reaching the performance level in the potential seismic source zone k in t years is:

$$P_{tk}(S_a \geq Y|M,R) = 1 - e^{-vt} \quad (2)$$

⑧ There are n potential seismic source zones in the field, and the exceeding probability of occurrence of an earthquake reaching the performance level in the field in t years is:

$$P(S_a \geq Y|M,R) = 1 - \Pi_{k=1}^{m}[1 - P_{tk}(S_a \geq Y|M,R)] \quad (3)$$

Figure 2:
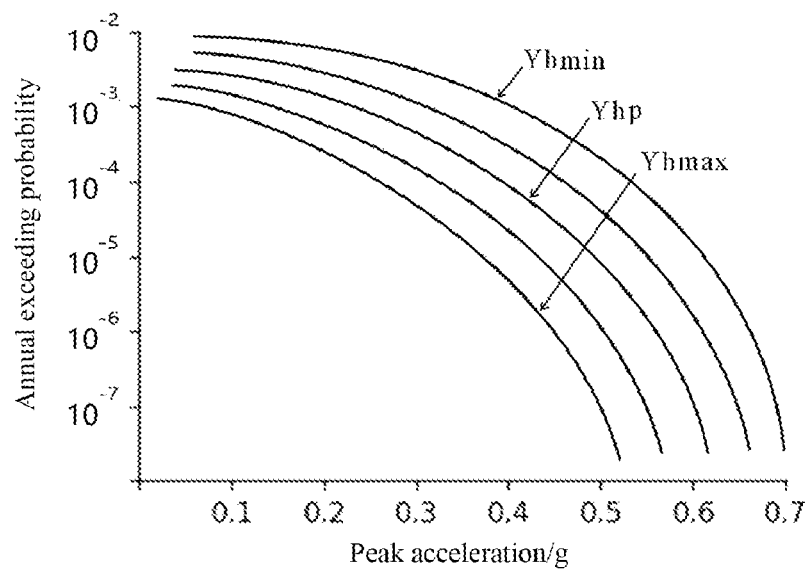
FIG. 2 is a seismic hazard curve of performance-level seismic motion-exceeding probability.

⑨ The return period of the earthquake reaching the performance level in the field in t years is:

$$T = -\frac{t}{\ln(1 - p(S_a \geq Y | M, R))} \quad (4)$$

q seismic hazard curves of performance-level seismic motion-exceeding probability are drawn, as shown in FIG. 2.

Figure 3:
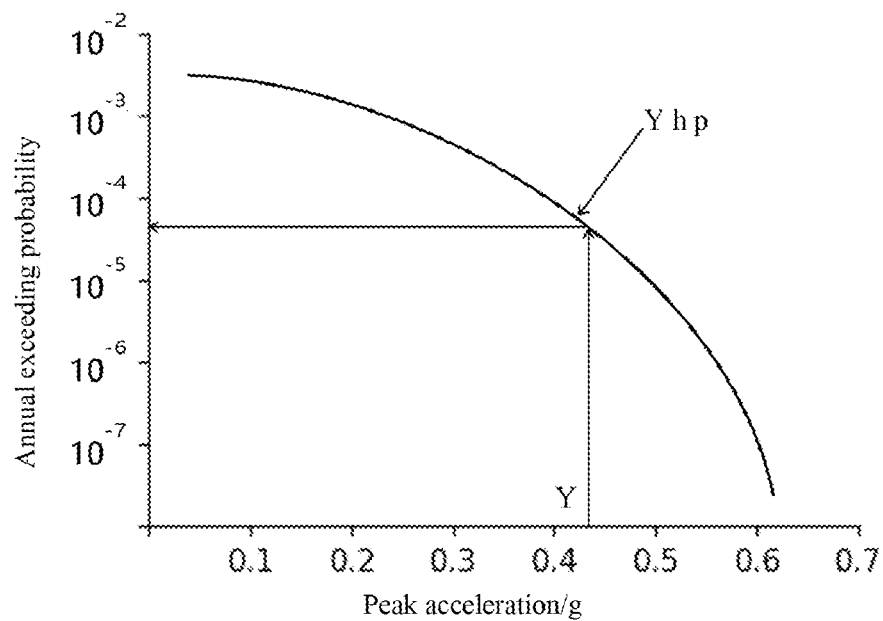
FIG. 3 illustrates a method for determining the exceeding probability of a performance-level seismic motion.
Figure 4:
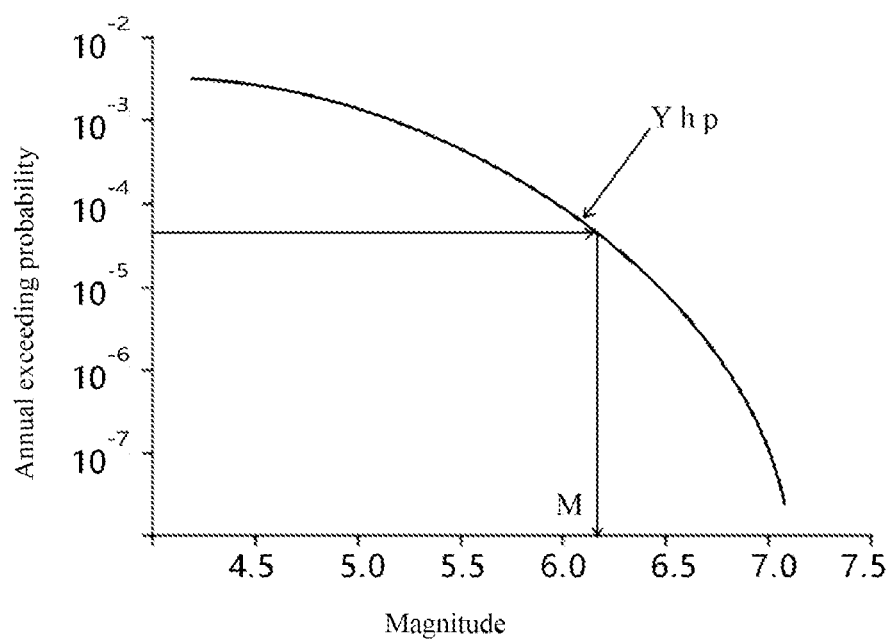
FIG. 4 illustrates a set earthquake magnitude of the performance-level seismic motion determined according to a consistent exceeding probability.

8. Determining a set magnitude and a set epicentral distance based on the performance-level seismic motion and a consistent probability ① Any one seismic hazard curve Yhp of performance-level seismic motion-exceeding probability is selected, and a corresponding exceeding probability is determined according to the performance-level seismic motion $Y_i$, as shown in FIG. 3; and a set earthquake magnitude $M_i$ reaching the performance-level seismic motion $Y_i$ is determined according to the consistent exceeding probability, as shown in FIG. 4.

② The m potential seismic source zones are equally divided into small seismic source zones at equal intervals, and a corresponding number of epicentral distances Ri from a field point to the small seismic source zones of the m potential seismic source zones are obtained.

③ The epicentral distances Ri are traversed, parameters such as $Y_i$ and $R_i$ are substituted into the trained deep neural network to calculate $M_{Y\eta_p}*$, and a set earthquake epicentral distance $R_i$ meeting the consistent exceeding probability and reaching the performance-level seismic motion $Y_i$ is screened out;

Wherein, the screening rule of $R_i$ is as follows:
1) In any one potential seismic source zone, $M_{imin} \le M_i \le M_{imax}$;
2) $M_{Y\eta_p}* \approx M_i$;
3) $R_i$ is within the corresponding seismic source zone;

The magnitude $M_i$ and the epicentral distance $R_i$ of a set earthquake reaching the performance-level seismic motion $Y_i$ and meeting the consistent probability are determined.

In the patent, the seismic motion attenuation relation is constructed by means of data drive and based on a deep neural network; a probabilistic seismic hazard analysis method is adopted to predict the annual exceeding probability and return period of a performance-level seismic motion; and the magnitude and epicentral distance of a set earthquake are determined based on the performance-level seismic motion and the consistent probability.

It should be noted that the deep neural network of the patent is essentially the seismic motion attenuation relation, and traditional statistical analysis can also obtain the seismic motion attenuation relation and provide an error range. By adoption of the performance-level motion hazard analysis method implemented in Step (7) and Step (8) of the invention, the exceeding probability and return period of the performance-level seismic motion and the magnitude and epicentral distance of a corresponding set earthquake can also be obtained, and details will not be given anymore.

What is claimed is:

1. A seismic motion hazard analysis method based on a three-layer dataset neural network to predict an exceeding probability and return period of a seismic motion so as to determine the magnitude and epicentral distance of a set earthquake, comprising the following steps:
   (1) extracting seismic motion data and denoising the seismic motion data;
   (2) extracting feature parameters from the seismic motion data;
   (3) generating a training set, an interval set and a test set;
   (4) training a multi-layer neural network based on the training set;
   (5) training output values of the multi-layer neural network based on the interval set, and calculating a mean and a standard deviation of relative errors of the output values;

wherein in step (5), data in the interval set are input to the multi-layer neural network trained in step (4) to obtain an output $M'_h*$ of each piece of data; the output $M'_h*$ is compared with true data $M_h$ to calculate a relative error $$\Delta M = \frac{M'^*_h - M_h}{M_h}$$

of each piece of output data, and the mean $\mu$ and the standard deviation $\varepsilon$ of the relative errors of the output values of the interval set are calculated;
   (6) training the multi-layer neural network based on the test set to determine the output values, and calculating a magnitude interval based on an interval confidence;

wherein in step (6), data in the test set are input to the multi-layer neural network trained in step (4) to obtain an output $M'_h$ of each piece of data; a relative error $\Delta M$ between the output $M'_h$ and true data $M_h$ is calculated based on the mean $\mu$ and the standard deviation $\varepsilon$ obtained in step (5); $M_h$ is expressed as $$M_h = \frac{M^*_h}{1+\Delta M} = \frac{M^*_h}{1+\mu \pm l\varepsilon};$$

the interval confidence is set to 95%; on a principle that 95% of $M_h$ fall within an interval $$\left[\frac{M^*_h}{1+\mu+l\varepsilon}, \frac{M^*_h}{1+\mu-l\varepsilon}\right],$$

a minimum value meeting a confidence requirement in the test set is calculated, and $$\left[\frac{M^*_h}{1+\mu+l\varepsilon}, \frac{M^*_h}{1+\mu-l\varepsilon}\right]$$

is a magnitude interval meeting the confidence requirement; and $$M^*_{hmin} = \frac{M^*_h}{1+\mu+l\varepsilon}$$

and $$M^*_{hmax} = \frac{M^*_h}{1+\mu-l\varepsilon}$$

are a minimum magnitude and a maximum magnitude within the magnitude interval, respectively;
   (7) carrying out probabilistic seismic hazard analysis; wherein step (7) comprises the following sub-steps:
      (7.1) determining a potential seismic source zone based on a three-level zoning principle;
      (7.2) determining an initial magnitude $M_0$ and a magnitude upper limit $M_{uz}$ of the potential seismic source zone, and determining n magnitude levels $M_j$ from the initial magnitude $M_0$ to the magnitude upper limit $M_{uz}$, wherein j=1, 2, . . . , n;
      (7.3) in terms of a G-R magnitude-frequency relation formula $$lgN=a-bM,$$

carrying out statistics on actual earthquake magnitudes M and frequencies N to determine values of a and b, setting an intermediate parameter $\beta$=bln 10, and calculating an annual occurrence rate $v_0$ of the initial magnitude and magnitudes above in the potential seismic source zone;
      (7.4) according to the seismic motion Y and a hypocentral distance R of the potential seismic source zone, obtaining q M*$_{Yhp}$ reaching the seismic motion Y between M*$_{Yhmin}$ and M*$_{Yhmax}$, that reach the seismic motion Y as verified in step (6), by a step length 0.1 of the magnitude levels, wherein M*$_{Yhmin}$ is a minimum magnitude value corresponding to the seismic motion Y, and M*$_{Yhmax}$ is a maximum magnitude value corresponding to the seismic motion Y;

(7.5) in any potential seismic source zone k, setting M$_{i\ min}$ and M$_{i\ max}$ as a minimum value and a maximum value in a magnitude level M$_i$, respectively, wherein M$_{i\ min}$≤M*$_{Yhp}$<M$_{i\ max}$; determining an occurrence rate of an earthquake exceeding the seismic motion Y in the k$^{th}$ potential seismic source zone $$v(S_a \geq Y \mid M, R) = \sum_{j=i}^{n} \frac{2v_0 \exp[-\beta(M_j - M_0)] \sinh\left(\frac{1}{2}\beta\Delta M\right)}{1 - \exp[-\beta(M_{uz} - M_0)]} \cdot f_{k,M_j};$$

in the formula, S$_\alpha$ is a seismic ground motion parameter including an acceleration, a velocity, or a response spectrum; v$_0$ is an annual average rate of earthquake occurrence in the potential seismic source zone; f$_{k,Mj}$ is a spatial distribution coefficient of the potential seismic source zone k and the magnitude level M$_i$ and f$_{k,Mj}$ is determined according to factors such as a seismic activity feature, a zonation map occurrence rate, a seismotectonic condition, a seismicity, a grid activity, an occurrence rate of a major earthquake, a medium and long term risk, and an elapsed time;

(7.6) calculating an exceeding probability of occurrence of an earthquake reaching the performance level in the potential seismic source zone k in t years:

$$P_{tk}(S_a \geq Y \mid M, R) = 1 - e^{-vt}$$

(7.7) when there are m potential seismic source zones in the field, calculating the exceeding probability of occurrence of an earthquake in the field in t years:

$$P(S_a \geq Y \mid M, R) = 1 - \Pi_{k=1}^{m}[1 - P_{tk}(S_a \geq Y \mid M, R)]$$

and (7.8) calculating the return period of the earthquake in the field in t years:

$$T = -\frac{t}{\ln(1 - p(S_a \geq Y \mid M, R))},$$

and drawing q seismic hazard curves of seismic motion-exceeding probability;

(8) determining a magnitude and an epicentral distance reaching the seismic motion based at least in part on the seismic motion; wherein step (8) comprises the following sub-steps:

(8.1) selecting one seismic hazard curve of seismic motion-exceeding probability, and determining a corresponding exceeding probability according to any one seismic motion Y$_i$; determining a set earthquake magnitude M$_i$ reaching the seismic motion Y$_i$;

(8.2) equally dividing the m potential seismic source zones into small seismic source zones at equal intervals, and obtaining a corresponding number of epicentral distances Ri from a field point to the small seismic source zones of the m potential seismic source zones; and (8.3) traversing the epicentral distances Ri, substituting parameters Y$_i$ and R$_i$ into a trained deep neural network to calculate, and screening out a set earthquake epicentral distance R$_i$ meeting the consistent exceeding probability and reaching the seismic motion Y$_i$;

wherein, a screening rule of R$_i$ is as follows:
1) in any one potential seismic source zone, ≤Mi≤;
2) ≈M$_i$;
3) R$_i$ is within a corresponding seismic source zone; and (9) predicting an exceeding probability and return period of a seismic motion by using the seismic motion hazard analysis method based on the three-layer dataset neural network so as to determine the magnitude and epicentral distance of a set earthquake.

2. The seismic motion hazard analysis method according to claim 1, wherein the seismic motion data in step (1) comprise an acceleration, a velocity and a displacement of ground motions.

3. The seismic motion hazard analysis method according to claim 1, wherein the feature parameters in step (2) comprise logarithm LnY of the seismic motion, magnitude M, focal distance R, focal depth H, fault type F, fault dip $\theta_1$, fault strike $\theta_2$, fault tendency $\theta_3$, slide angle $\theta_4$, record longitude $\theta_{OX}$, dimensionality $\theta_{OY}$ and field V$_{30}$.

4. The seismic motion hazard analysis method according to claim 3, wherein a correlation of the feature parameters is verified, specifically, information gain $$Gain(A,B) = H(A) - H(A \mid B)$$

of every two features is calculated, wherein A is a feature parameter, Gain(A,B) is a reduction of an uncertainty of an exceeding probability B under the condition where the feature parameter A of the information gain is constant, and H(A/B) is a condition entropy when the feature parameters are fixed; a degree of the correlation is less than 10%; when the degree of the correlation is greater than 10%, corresponding features need to be removed to form a new data list, and a final feature parameter is x.

5. The seismic motion hazard analysis method according to claim 4, wherein the final feature parameter x is initialized, all final feature parameters x are scaled to 0-1, and a transfer function is:

$$x'_i = \frac{x_i - x_{imin}}{x_{imax} - x_{imin}}$$

in the function, x$_{i\ min}$ is a minimum value of a feature parameter x$_i$, and x$_{i\ max}$ is a maximum value of the feature parameter x$_i$; and the magnitude M is taken as a last column of a data list, and initialized data are ranked by the magnitude M from small to large to establish a new input list.

6. The seismic motion hazard analysis method according to claim 5, wherein in step (3), data for the training set, data for the interval set and data for the test set account for 60%, 20% and 20% of a total data size, respectively.

7. The seismic motion hazard analysis method according to claim 2, wherein the feature parameters in step (2) comprise logarithm LnY of the seismic motion, magnitude M, focal distance R, focal depth H, fault type F, fault dip $\theta_1$, fault strike $\theta_2$, fault tendency $\theta_3$, slide angle $\theta_4$, record longitude $\theta_{OX}$, dimensionality $\theta_{OY}$ and field V$_{30}$.

* * * * *